United States Patent [19]

Scherzer et al.

[11] 4,139,749
[45] Feb. 13, 1979

[54] CONTROL LEVER ACTUATED SWITCH

[75] Inventors: Wolfgang Scherzer, Bad Neustadt; Ekkehard Woesthoff, Wermelskirchen; Oswald Reuss, Unterelsbach, all of Fed. Rep. of Germany

[73] Assignee: Preh, Elektrofeinmechanische Werke, Jakob Preh Nachf, Bad Neustadt, Fed. Rep. of Germany

[21] Appl. No.: 775,313

[22] Filed: Mar. 7, 1977

[30] Foreign Application Priority Data

Mar. 10, 1976 [DE] Fed. Rep. of Germany ....... 2609906

[51] Int. Cl.² .................. H01H 9/00; H01H 15/00
[52] U.S. Cl. .................................. 200/61.54; 200/4; 200/16 D
[58] Field of Search ............... 200/4, 11 TW, 61.27, 200/61.54, 16 D, 292; 361/398

[56] References Cited

U.S. PATENT DOCUMENTS

| 3,399,282 | 8/1968 | Nagashima et al. | 200/16 D |
| 3,476,900 | 11/1969 | Sharples | 200/292 X |
| 3,683,132 | 8/1972 | Richardson | 200/11 R |
| 3,721,940 | 3/1973 | Michel et al. | 200/292 X |
| 3,745,288 | 7/1973 | Reimer | 361/398 X |
| 3,940,579 | 2/1976 | Buhl et al. | 200/61.54 X |
| 3,958,087 | 5/1976 | Mol et al. | 200/11 TW X |

FOREIGN PATENT DOCUMENTS

| 2403131 | 7/1975 | Fed. Rep. of Germany. |
| 2423514 | 11/1975 | Fed. Rep. of Germany. |
| 805412 | 12/1958 | United Kingdom. |
| 1060305 | 3/1967 | United Kingdom. |
| 1130181 | 10/1968 | United Kingdom. |
| 1258440 | 12/1971 | United Kingdom. |
| 1313187 | 4/1973 | United Kingdom. |
| 1429680 | 3/1976 | United Kingdom. |

Primary Examiner—James R. Scott
Attorney, Agent, or Firm—Thomas E. Beall, Jr.

[57] ABSTRACT

A switch actuated by a control lever associated with a steering column for operating direction-indicating lamps, switching the headlights to low and high beam, operating the screen wiper and actuating similar functions includes a housing in which an end portion of a flexible band-type cable is fixed. The control lever is mounted in the housing for rocking about a pair of mutually perpendicular axes and actuating a pair of sliders each guided within the housing for movement along one of the axes. The band-type cable includes a plurality of printed conductors covered by an insulation. At the end portion of the cable, the conductors have exposed portions not covered by the insulation, which exposed portions form fixed contacts cooperating with movable contacts carried by the sliders. The remaining portion of the cable extends outwardly of the housing for connecting the fixed contacts to a power supply and the respective electrical devices operated by the switch. Resilient detent means are provided for retaining the control lever in at least some of its various switching positions.

18 Claims, 4 Drawing Figures

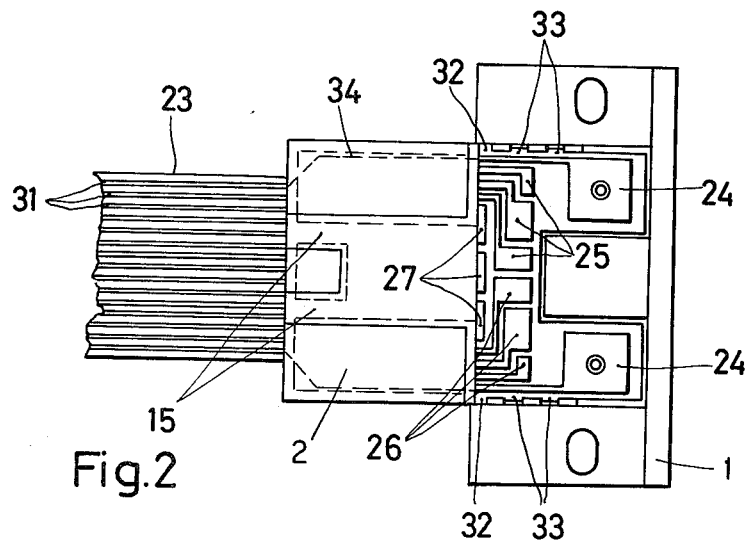
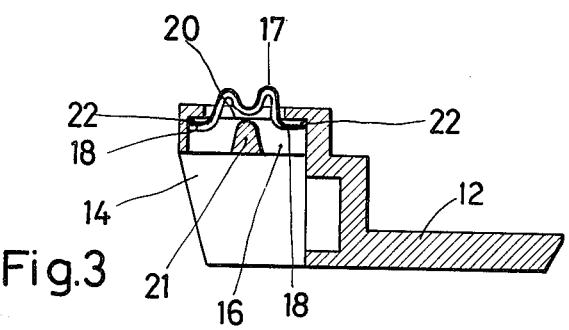
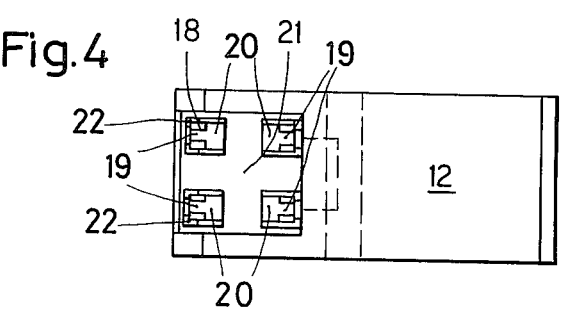

CONTROL LEVER ACTUATED SWITCH

BACKGROUND OF THE INVENTION

This invention relates to a control lever actuated switch as typically mounted on the steering column of an automobile for switching various signalling and lighting circuits, e.g. turning on the direction indicating lamps, switching the headlights to high and low beam, starting the screen wiper and actuating a light signalling device. The switch is usually connected by a plurality of conductors to the battery, the ignition lock, the lamps and the instrument panel.

A switch of this type is known from German Utility Model specification No. 7,201,631 in which each individual switch unit is formed as a plug-in module provided with connector pins inserted into corresponding sockets disposed on a common base plate of plastics material. The sockets are electrically connected to interconnecting lines either directly or by means of further plug-and-socket connectors. The necessary electrical connections between the individual plug-in modules are provided by metal strips moulded in the base plate and may be electrically interrupted if necessary by making cut-outs in the base plate.

German Patent specification No. 1,655,840 discloses a further control lever actuated switch in which fixed contacts are mounted on a base portion of insulating material and connected to interconnecting lines by means of plug-and-socket connectors. A slider is actuated by the control lever for sliding movement relative to the base portion and carries a pair of contacts cooperating with the fixed contacts. Upon actuation of the control lever, one of the pair of movable contacts slides on a continuous contact strip forming one of the fixed contacts, while the other movable contact engages a respective one of a plurality of individual fixed contacts disposed opposite the continuous contact strip.

A basic problem encountered with the above prior art switches results from the unreliability of the plug-and-socket connections used.

In order to reduce the number of plug-and-socket connections (which are required other than for connecting the switch), it is known from German Offenlegungsschrift No. 2,256,948 to employ flexible band-type cables having printed conductors, wherein individual indicating lamps and switches are mounted directly in apertures or slots provided in the cable. Another use of such a band-type cable as a bus connection in an automobile disclosed in German Offenlegungsschrift No. 2,165,248. There, however, the various devices to be operated by switches are still connected to the cable by means of plug-and-socket connections. Thus, while the wiring is simplified through the use of multiple-conductor cables, there is still the disadvantage that the plug-and-socket connections are unreliable and, moreover, time-consuming in assembly.

It is an object of the invention to provide a control lever actuated multiple-function switch which is more reliably and more easily connected to the interconnecting lines leading to the respective devices to be switched. It is a further object of the invention to devise a switch of this type wherein the interconnecting lines are formed by a multiple-conductor cable. It is a further object of the invention to provide a switch of the above type connected to a flexible band-type multiple-conductor cable, which is easy to assemble and wherein plug-connections are avoided.

SUMMARY OF THE INVENTION

A control lever actuated switch in accordance with the present invention comprises a housing, a control lever mounted on said housing for rocking movement between a plurality of switching positions, the housing and the control lever including detent means for retaining the lever in at least part of said switching positions, a flexible band-type cable including a plurality of printed conductors and having an end portion held within the housing, exposed portions of said conductors inside the housing forming fixed contacts, slider means movably disposed within the housing for operation by said control lever and including movable contact bridges cooperating with said fixed contacts, said cable extending through a slot provided in the housing for external connection of said fixed contacts. The fixed contacts of the switch according to this invention are thus directly formed by exposed portions of the cable conductors thereby avoiding the necessity of any connectors between the switch and the cable.

In a preferred embodiment of the invention, the housing includes a base portion and a cover portion, and the end portion of the cable is inserted between the base and cover portions. A particularly easy to assemble structure is thus achieved.

In a further advantageous embodiment of the invention, the housing cover portion has first and second parts, wherein the first part is formed integral with the housing base portion, and the second part is detachably connected to the base portion and the first part of the cover portion. A slot is provided between the base portion and the first part of the cover portion through which the band-type cable is fed during assembly of the switch. Guide and locking means provided in the housing and on the cable insure firm locating of the cable within the housing in a position in which the fixed contacts provided by the cable are properly adjusted with respect to the movable contacts carried by the slider means.

The slot formed at one end of the housing advantageously has rounded-off outer edges to prevent the cable from being damaged by sharp bends. In a further preferred embodiment, the slot includes an interior sealing lip to protect the contacts inside the housing against dust and moisture.

BRIEF DESCRIPTION OF THE DRAWINGS

Further objects, advantages and details of the invention will become apparent from the following description of a preferred embodiment with reference to the drawings. In the drawings

FIG. 2 is a plane view of the switch housing, seen from below in FIG. 1, with a part of the housing cover portion removed;

FIG. 3 is a longitudinal section of a slider as shown in FIG. 1, but at an enlarged scale; and FIG. 4 is a view of the slider, seen from below in FIG. 3.

DETAILED DESCRIPTION OF THE PREFERRED EMBODIMENT

Figure 1:
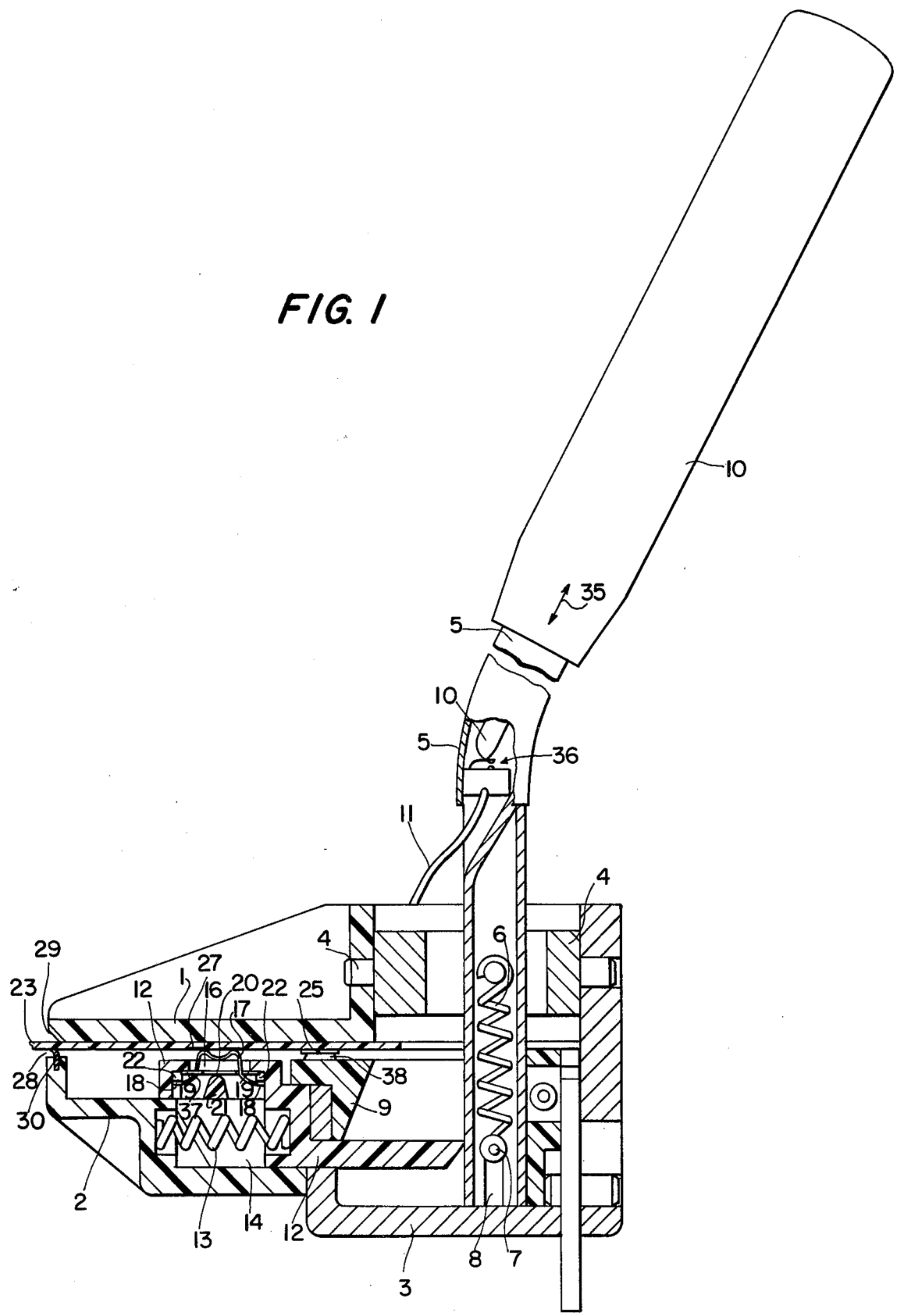
FIG. 1 is a cross-section through a control lever actuated switch.

Referring to FIG. 1 of the drawings, the switch housing includes a base portion 1 and a two-part cover portion 2,3. The part 2 of the cover portion is formed integral with the base portion 1, and these elements are made of plastics material. The other part 3 of the cover portion is made of die-cast zinc and forms a cap for closing the housing.

A control lever 5 is mounted in the housing by means of a gimbal-type joint 4 for rocking about two mutually perpendicular axes. The control lever 5 is thus adapted to be set to a plurality of switching positions in which it may be retained by detent means. While those detent means are not part of the invention and therefore not shown in detail, the detent means for the rocking motion of the control lever 5 about the axis extending perpendicular to the plane in which FIG. 1 is drawn as indicated to include a detent pin 7 loaded by a spring 6 and guided by slots 8 extending longitudinally from the end of the control lever 5 at opposite sides thereof. When the control lever 5 is rocked about that axis, the detent pin 7 moves over a projection (not shown) into a respective further rest position.

The control lever 5 consists of a metal tube having a handle 10 at the end remote from the switch housing and including a pair of contacts 36 schematically shown, which may be operated by pressing the handle 10 to cause a telescopic sliding 35 of the handle 10 on the metal tube. The interconnecting lines 11 from this pair of contacts extend through the interior of the metal tube and emerge therefrom at a location close to the joint 4.

A first slider 9 is movable in a direction perpendicular to the plane in which FIG. 1 is drawn, and is moved when the control lever 5 is pivoted about the axis extending horizontally in FIG. 1. A second slider 12 is movable in the horizontal direction according to FIG. 1 and operated upon rotation of the control lever 5 about its other axis. A compression spring 13 is disposed between the slider 12 and an interior wall of the part 2 of the housing cover portion to bias the slider 12 against the lower end of the control lever 5. The slider 12 has lateral walls 14 shown in FIG. 3 by which the slider is guided in corresponding grooves 15 formed in the part 2 of the housing cover portion indicated by broken lines in FIG. 2.

Referring to FIGS. 3 and 4, the slider 12 has two chambers 16 each accomodating a contact bridge 17. Each contact bridge 17 is formed of a W-shaped metal strip with each free end 18 of the strip being provided with a slot 37 (the left hand free end being partly in section in FIG. 1). The lugs formed by the slot are bent at a location about midway of the slot, 37A leaf spring 20 is combined with the W-shaped strip, with extensions 19 of the leaf spring 20 inserted in the slots 37 of the strip. At a substantially central point, the leaf spring 20 resiliently bears against a nose-like support 21, and the extensions 19 rest on recesses provided in the bottom of the chamber 16. On the other hand, the free ends 18 of the contact bridge 17 rest on elevated portions 22 disposed at both sides of the recesses.

The other slider 9 which is movable in the vertical direction of FIG. 2 is constructed similar to the slider 12 and provided with similarly designed contact bridges 38. The contact bridges 38 of this slider 9 cooperate with fixed contacts formed by exposed portions of printed conductors of a flexible band-type cable 23. A number of such exposed contact portions 24 to 27 are seen in FIG. 2 where the cap part 3 of the housing cover portion has been removed. Among them, the contact portions 25 may be associated with parking lights, the contact portions 26 with direction indicating control lamps, and the contact portions 27 with the direction indicating lamps proper. In FIG. 2, the contact portions 27 are partly hidden behind the part 2 of the housing cover portion. The further contact portions 24, which do not cooperate with contact bridges carried by the slider 9, have rivets mounted on them which serve to fix the cable 23 to the housing base portion 1. At the same time, the interconnecting lines 11 leading to the pair of contacts contained in the handle 10 are crimped to those rivets.

The end portion of the cable 23 located inside the housing includes further contact portions which are completely hidden by the part 2 of the housing cover portion in FIG. 2. Those contact portions are provided for the high and low beam as well as for light signalling and cooperate with the contact bridges 17 of the slider 12.

The end portion of the cable 23 lies between the housing base portion 1 by which it is held and the part 2 of the housing cover portion. When assembling the switch, the cable 23 is fed out of the housing through an elongated outlet slot 28 provided between the housing base portion 1 and the part 2 of the housing cover portion. To avoid damage to the cable, the outer edge 29 of the slot 28 are rounded as shown in FIG. 1.

As also shown in FIG. 1, the outlet slot 28 is sealed by a sealing lip 30 inserted into a groove of the part 2 of the housing cover portion and resiliently bearing against the cable 23. The interior of the housing is thereby protected against contaminations which would otherwise affect the reliability of the contacts. Outside the housing, the printed conductors 31 leading to the contact portions are protected against the environment by an insulating layer.

The cable 23 is guided at both lateral sides in grooves 34 shown in broken lines in FIG. 2 and provided in sidewalls of the part 2 of the housing cover portion. In order exactly to position the contact portions with respect to the contact bridges, the cable 23 has lateral projections 32 engaging abutment shoulders of the part 2 of the housing cover portion. In addition, both lateral edges of the cable 23 are provided with comb-shaped noses 33 which cooperate with correspondingly shaped recesses (not shown) of the part 3 of the housing cover portion.

The flexible band-type cable 23 may be arranged (not illustrated in the drawing) within the housing so that the fixed contacts are disposed in a plurality of planes.

Further details of the switch, such as a releasing cam for resetting the control lever, are not shown in the drawings and will not be described as they are known and form no part of the present invention.

What is claimed is:

1. A control lever actuated switch for mounting on the steering column of a motor vehicle, comprising:
    (a) a housing mountable on the steering column of the motor vehicle;
    (b) a control lever mounted on the housing for separate rocking movement independently about two mutually perpendicular axes between a plurality of switching positions for each such movement, the housing and the control lever including detent means for retaining the lever in at least part of said switching positions;
    (c) a flexible band-type cable including a plurality of separate printed electrical conductors extending along its length and having an end portion held within the housing, exposed portions of said conductors inside the housing forming corresponding fixed contacts;

(d) movable contact means including two separate sliders, each of said sliders having a contact bridge, each of said sliders being mounted for independent movement within the housing along, respectively, generally mutually perpendicular separate paths between at least two switching positions with one of said slider switching positions placing its contact bridge in electrical contact with some of said fixed contacts, and each of said sliders being drivingly connected to said lever so as to be independently driven by said control lever with one of said sliders moving along its path between its switching positions in response to rocking of said lever about one of said axes between its corresponding switching positions and the other of said sliders being moveable along its path between its switching positions in response to rocking of said lever about the other of said axes between its corresponding switching positions, so as to move said slider contact bridges into and out of bridging relationship with corresponding ones of said fixed contacts at respective switching position; and (e) said cable extending through an opening provided in the housing for external electrical connection of said electrical conductors outside of said housing.

2. The switch of claim 1, wherein said fixed contacts are disposed in a plurality of planes.

3. The switch of claim 1, wherein said housing comprises a base portion and a cover portion, said cable end portion being disposed between said base and cover portions.

4. The switch of claim 3, wherein said housing cover portion includes first and second parts, said first part being formed integral with said base portion and said second part being detachably connected to said first part and said base portion.

5. The switch of claim 4, wherein said first part of said housing cover portion includes means for positioning said cable.

6. The switch of claim 5, wherein said positioning means comprises grooves formed in the sidewalls of said first part of said housing cover portion adjacent said base portion.

7. The switch of claim 4, wherein said housing base portion and said first part of said housing cover portion are made of insulating material and said second part is made of metal.

8. The switch of claim 3, wherein said housing base portion and said cable end portion having locking means for retaining said cable in fixed relation with said housing.

9. The switch of claim 8, wherein said locking means includes noses formed on said cable end portion and recesses formed in said housing cover portion for cooperating with said noses.

10. The switch of claim 8, including additional switch contact means operable by said lever independently of said sliders, and wherein said locking means include rivet means extending through at least one of said conductors for fixing said cable to said housing and simultaneously providing electrical connection for the additional contact means associated with said control lever.

11. The switch of claim 10, wherein said lever is constructed of at least two telescoping portions reciprocable towards and away from each other with operation of said additional switch contact means.

12. The switch of claim 1, wherein said housing comprises a base portion and a two-part cover portion, one of said sliders being movable within one part of said cover portion and the other slider being movable within the other part of said cover portion.

13. The switch of claim 1, wherein said movable contact bridges each having a substantially W-shaped metal strip retained in a chamber formed in said slider, both free ends of said strip being slotted in the longitudinal direction of the strip to form a pair of lugs, said lugs being bent at about the middle of their length.

14. The switch of claim 13, wherein each of said movable contact bridges further includes a leaf spring extending through the entire length of said W-shaped metal strip and having extensions inserted into said slotted ends of said strip, a middle portion of said leaf spring resiliently engaging a support formed within said chamber.

15. The switch of claim 1, wherein said cable is enlarged at said end portion and is mounted in said housing by feeding said cable through said opening outwardly from within said housing, said cable including stop means for limiting the feeding movement.

16. The switch of claim 15, wherein said stop means includes lateral projections formed on said cable end portion and shoulders formed in said housing for engagement by said projections.

17. The switch of claim 1, further comprising a sealing lip mounted on said housing to extend across said opening for engaging said cable and sealing said opening.

18. The switch of claim 1, wherein said housing has rounded-off outer edges at said opening to guide said cable into said opening during mounting of said cable in said housing.

* * * * *